US008636932B2

(12) United States Patent
Cherdon et al.

(10) Patent No.: US 8,636,932 B2
(45) Date of Patent: Jan. 28, 2014

(54) PROCESS FOR THE PRODUCTION OF GRANULES FROM POWDERED MATERIALS

(75) Inventors: Benoit Cherdon, Jumet (BE); Rodolphe Delaval, Arques (FR)

(73) Assignees: AGC Glass Europe, Brussels (BE); ARC International, Arques (FR)

( * ) Notice: Subject to any disclaimer, the term of this patent is extended or adjusted under 35 U.S.C. 154(b) by 128 days.

(21) Appl. No.: 13/320,449

(22) PCT Filed: Jun. 2, 2010

(86) PCT No.: PCT/EP2010/057733
§ 371 (c)(1),
(2), (4) Date: Nov. 14, 2011

(87) PCT Pub. No.: WO2010/139739
PCT Pub. Date: Dec. 9, 2010

(65) Prior Publication Data
US 2012/0061872 A1 Mar. 15, 2012

(30) Foreign Application Priority Data
Jun. 3, 2009 (EP) ..................................... 09161823

(51) Int. Cl.
*B29C 67/02* (2006.01)
(52) U.S. Cl.
USPC .......... 264/117; 264/113; 264/115; 23/313 R; 23/313 AS; 23/313 P; 65/21.1
(58) Field of Classification Search
None
See application file for complete search history.

(56) References Cited

U.S. PATENT DOCUMENTS

| 4,081,259 A | 3/1978 | Bassin et al. |
| 4,235,618 A | 11/1980 | Henry et al. |
| 6,805,821 B2 * | 10/2004 | Phinney ....................... 264/117 |
| 2008/0087044 A1 | 4/2008 | Carty |

OTHER PUBLICATIONS

International Search Report Issued Aug. 6, 2010 in PCT/EP10/057733 Filed Jun. 2, 2010.

* cited by examiner

*Primary Examiner* — Mary F Theisen
(74) *Attorney, Agent, or Firm* — Oblon, Spivak, McClelland, Maier & Neustadt, L.L.P.

(57) ABSTRACT

The present invention relates to a process for the wet production of granules from powdered materials, in particular raw materials for the production of glass. The process of the invention comprises the following successive steps: (i) the powdered materials to be granulated are divided into at least two portions: a first portion and a second portion; (ii) a binder liquid is added to the first portion of powdered materials; (iii) the first mixture thus obtained is agglomerated in the granulator in order to obtain granules (a); (iv) the second portion of powdered materials is added to the granulator; and (v) the new mixture obtained is agglomerated in the granulator in order to obtain granules (b). This sequenced granulation process allows granules to be obtained that have a degree of moisture that assures their stability and their ease of handling eliminating the drying step.

18 Claims, No Drawings

PROCESS FOR THE PRODUCTION OF GRANULES FROM POWDERED MATERIALS

1. FIELD OF THE INVENTION

The present invention relates to a process for the production of granules from powdered materials, in particular raw materials for the production of glass (or vitrifiable materials). More specifically, the invention relates to an improved process for the wet granulation of powdered materials for the production of glass, wherein the granules obtained are intended to be subsequently fed into a melting furnace.

2. SOLUTIONS OF THE PRIOR ART

In glass production the cost of energy represents a very significant proportion of the total production cost. To reduce energy consumption in glass production, in particular by improving the fusion kinetics of the raw materials in the furnace (melting rate, homogeneity), various types of processes have been proposed hitherto, of which preheating the raw materials with the residual heat of the gases discharging from the furnace and/or granulating said raw materials are the best known. In particular, granulation is an advantageous process in that it allows the difficulty of heating the powdered raw materials inside the furnace to be reduced satisfactorily, which results from the poor transmission of heat by conduction and also from the premature melting of the most meltable constituents of the charge. The melting and/or refining of vitrifiable raw materials in the form of granules is more rapid while also giving the melted glass a better homogeneity. Moreover, it is obviously far easier to handle granules than to handle charges in powder form.

Moreover, the granulation solution is all the more advantageous since it allows prevention of
  the risk of the various constituents separating either during storage in silos or hoppers under the action of gravity or on conveyor belts as a result of vibrations; and
  the dispersal of so-called "fine" particles of the vitrifiable raw material (dusts) with all the consequences thereof on the output of the melting furnace, but also on the service life of the arches of the furnace. Moreover, this disadvantage can have an impact on the environment, since the dusts that disperse can pose air pollution problems.

In a known manner, a classic granulation of powdered materials is conducted in a granulator by adding to the raw materials of the glass in powder form a binder liquid that is classically water, to which an additive such as caustic soda is often added. This binder liquid is essential to allow formation of the granule, as it acts as lubricant and enables agglomeration of the mixture. This is thus referred to as "wet granulation".

The water content usually applied for an efficient granulation of powdered materials ranges from 7% to 14% by weight in relation to the charge to be granulated and ideally is above 10% by weight. Several alternatives have been examined with regard to the nature and quantity of the binder additive, the manner in which the binder liquid is added to the powdered material etc. (see in particular patents FR1556285, U.S. Pat. No. 3,969,100 and U.S. Pat. No. 4,031,175). Nevertheless, in a wet granulation operation, once formed, the granules must then be dried in order to assure their stability for subsequent handling, but also to prevent them from bursting when fed into the melting furnace as a result of violent evaporation of the water they contain. The water content of the raw materials used for glass production and intended to be fed into the melting furnace in the form of granules is classically in the order of 2% to 6% by weight.

The drying step of the "wet" granules occurs in a drier such as a rotary drum- or fluidised bed-type drier, for example, and allows "dry" granules with an ideal water content to be obtained.

The conventional method of producing dry granules using a wet granulation operation therefore requires two quite distinct steps (granulation and drying) and consequently requires a granulator that is independent of a drier as well as the additional handling steps (transfer) resulting therefrom. Therefore, this process has certain disadvantages, principally from the handling point of view. In fact, the steps of additional handling relating to the transfer from the granulator to the drier are complicated:
  the powdered materials to which the liquid binder is added "stick" hard and the wet granules, the intermediate products in this process, are difficult to handle and remove from the granulator;
  the wet granules have low resistance and therefore they often break up during transport to the drier, but also during drying.

In addition, a major disadvantage of this process is the energy necessary to dry the wet granules, and this will reduce the energy gain obtained because of the granulation in the particular case of glass raw materials for glass.

There is also a single set of equipment enabling granulation and drying, but these two steps can still not be conducted at the same time and must be consecutive. Even if it was possible to overcome, at least partially, the disadvantages associated with handling and transfer, this type of equipment does not in any event eliminate the main disadvantage of energy consumption related to the drying itself.

3. OBJECTIVES OF THE INVENTION

An objective of the invention in particular is to remedy the disadvantages of the prior art by resolving the technical problem(s), i.e. the energy consumption and the additional handling required for the drying step.

More specifically, an objective of the invention in at least one of its embodiments is to provide an efficient process of wet granulation that allows omission of the drying step together with its above-mentioned disadvantages.

Another objective of the invention in at least one of its embodiments is to provide a process of wet granulation that enables granules to be obtained with a degree of moisture that assures their stability and their ease of handling as well as a relatively low residual ratio of fine non-granulated particles.

Finally, an objective of the invention is also to provide a simplified and economical solution to the disadvantages of the prior art.

4. OUTLINE OF THE INVENTION

According to a particular embodiment, the invention relates to a process for the production of granules from powdered materials.

According to the invention the process for the production of granules from powdered materials comprises the following successive steps:
  the powdered materials to be granulated are divided into at least two portions: a first portion and a second portion;
  a binder liquid is added to said first portion of powdered materials;

the first mixture thus obtained is agglomerated in a granulator in order to obtain granules (a);

the second portion of powdered materials is added to said granulator;

the new mixture obtained is agglomerated in the granulator in order to obtain granules (b).

Hence, as a result of the process of the invention a solution can be provided for the disadvantages of the wet granulation process of the prior art and the technical problem(s) raised can be resolved. In fact, the inventors have demonstrated that it was possible to eliminate the drying step conventionally used in the prior art by sequencing the actual granulation step in a particular manner.

Consequently, the invention is based on a completely new and inventive approach since it allows granules that have an adequate moisture content to be obtained in a granulator at the end of the process of the invention without resorting to an additional step of drying accompanied by the resulting disadvantages thereof.

According to the process of the invention the powdered materials to be granulated are divided into at least two portions: a first portion and a second portion.

In one of the particular embodiments of the invention the first portion of powdered materials has an identical composition to that of the second portion of powdered materials. The process for the production of granules according to the invention is referred to in this case as "homogeneous granulation".

In another particular embodiment of the invention the first portion of powdered materials has a different composition from that of the second portion of powdered materials. The process for the production of granules according to the invention is referred to in this case as "heterogeneous granulation". In this type of granulation it is therefore possible to selectively combine particular components of a batch of powdered materials within the same granule. In the particular case where the powdered materials are formed from vitrifiable materials, this type of heterogeneous granulation allows certain fusion parameters to be further improved such as an additional increase in the fusion efficiency or a more significant reduction in the separation action. In fact, the selective batching of vitrifiable raw materials allows the reaction paths existing in the ternary system $CaO$—$Na_2O$—$SiO_2$ to be controlled, as explained in the patent application US2005/0022557 A1. In this application some raw materials are combined in a first batch of granules and other raw materials are combined in a second batch of granules. The two batches of granules are then simply combined before being placed in the furnace. This process of selective batching thus allows two distinct granulations and thus increases the number of steps to be conducted and the handling. Advantageously, the process for the production of granules according to the invention allows a heterogeneous granulation of powdered raw materials to be achieved in a single granulation operation forming granules that each have at least two different and localised compositions of raw materials within them.

Other features and advantages of the invention shall become more clear after reading the following description of preferred embodiments given as simple illustrative and non-restrictive examples.

5. DESCRIPTION OF AN EMBODIMENT OF THE INVENTION

The process of the invention is a process for the production of granules from powdered materials. Powdered material is understood to mean a compound that is in powder form and comprises a significant proportion of so-called "fine" particles. The average diameter of these fine particles is typically less than about 100 microns.

According to the invention, the powdered materials to be granulated have a water content in the range of about 0% to about 4% by weight. The powdered materials to be granulated preferably have a water content of between 0% and about 1% by weight.

According to a particular embodiment, the powdered materials are formed from raw materials intended for the production of glass in a melting furnace or vitrifiable materials. Typically, these vitrifiable materials contain, amongst other substances, silica sand, limestone, dolomite, aluminium oxide, feldspar, sodium carbonate. Other ingredients are also often present in these vitrifiable materials such as pigments (iron, cobalt, chromium oxides . . . ) and so-called formative elements (PbO, MgO, ZnO, BaO . . . ). In the case of this embodiment the granules obtained by the process of the invention are intended to be subsequently fed into a melting furnace, either immediately after their production or after a storage period.

According to the invention, the powdered materials to be granulated are divided into at least two portions: a first portion and a second portion. It is preferred that the first portion of powdered materials represents at least 25% by weight of the powdered materials to be granulated. It is also preferred that it represents 75% by weight at most of the powdered materials to be granulated.

The granulation according to the invention can be conducted in any known type of granulator such as a drum granulator, a granulator disc or a mixer-granulator such as a blade-type, turbine-type, double cone-type, ribbon-type etc. mixer-granulator.

The binder liquid used in the present invention preferably contains water. It preferably also contains one or more additives. Examples of appropriate binder liquids to be cited are an aqueous solution of caustic soda, sodium silicate or other sodium salt. An aqueous solution of sodium silicate is particularly preferred.

The binder liquid can first be added to the first portion of raw materials in a mixer. The wet mixture thus obtained is then passed to the granulator. It is preferred according to the invention that the binder liquid is added directly to the first portion of powdered materials in the granulator. The binder liquid according to the invention can be added to the first portion of powdered materials classically by atomisation or spraying into the granulator.

The quantity of binder liquid added to the first portion of powdered materials ranges between 8% and 20% by weight of said first mixture. Preferably, the quantity of binder liquid added to the first portion of powdered materials ranges between 8% and 16% by weight of said first mixture.

The binder liquid and the first portion of powdered materials form said first mixture within the granulator.

According to the invention, the first mixture obtained from the binder liquid and the first portion of powdered materials is compacted in a granulator. During this step the mixture is mixed vigorously, the powdered materials are agglomerated and granules (a) referred to as "wet" (compared to granules (b) obtained in the last step of the process) are formed therefrom. The mixture can be heated (classically between 70° and 85° C., for example) prior to compaction.

When the wet granules (a) are formed, the second portion of powdered materials is added to said granules (a) in the granulator. Granules (a) and the second portion of powdered materials form said new mixture within the granulator.

According to the invention, the new mixture obtained from granules (b) and the second portion of powdered materials is agglomerated in the granulator. Granules (b) referred to as "dry" (compared to granules (a)) are formed as a result of this step. The new mixture can also be heated (classically between 70° and 85° C., for example) prior to compaction.

Granules (b) according to the invention have an average water content in the range of between 2% and 6% by weight that is ideal for their handling and mechanical stability. Granules (b) preferably have a water content in the range of between 3% and 5% by weight.

Granules (b) according to the invention vary in size between 0.1 and 8 mm. Size is understood to denote the largest dimension of a granule.

In an embodiment of the invention, the first portion of powdered materials has a different composition from that of the second portion of powdered materials, a heterogeneous granulation is then implemented. In this embodiment homogeneous granules (a) in composition A are firstly formed from the first portion of powdered materials of composition A. The second portion of powdered materials of composition B is then added to the granulator and heterogeneous granules (b) are then obtained. They are formed from a "core" of composition A enclosed by a casing of composition B. According to this embodiment of the invention the batch of powdered materials to be granulated can be divided into more than two portions in order to obtain heterogeneous granules having a core enclosed by several different casings.

Other advantageous details and features will become clear below from the description of non-restrictive exemplary embodiments of the process according to the invention.

EXAMPLES

In Accordance with the Invention

Example 1

(homogeneous granulation)—granules were produced according to the process of the invention from the following batch of powdered materials:

| Raw materials | % by weight |
|---|---|
| Silica sand | 69 |
| Sodium carbonate | 30 |
| Sodium sulphate | 0.4 |
| Aluminium oxide | 0.6 |

The initial water content of the starting batch is lower than 1% by weight.

The batch was separated into two portions with the same composition: a first portion corresponding to 45% by weight of the starting batch and a second portion corresponding to 55% by weight of the starting batch.

The first portion was fed into a rotary drum-type granulator. An aqueous solution of sodium silicate $Na_2O \cdot xSiO_2 \cdot H_2O$ with x=3.4 to 2.5% by weight was then added to the granulator by spraying while the granulator was in rotation mode. The quantity of sodium silicate added was 10% by weight in relation to the mixture of solution and first portion of raw material and the period of rotation of the granulator was about 10 minutes. "Wet" granules were thus obtained.

The second portion was then fed to the first granules formed in the granulator while the granulator was in rotation mode. This time, the period of rotation of the granulator was about 2 minutes.

Granules having an average water content of 4.5% by weight were thus obtained. Their size varies from approximately 0.1 mm to approximately 5 mm. They have a good stability and a sufficient resistance during handling and during storage over time. Moreover, the quantity of "fines" particles present in the granulator at the end of the granulation process is very low.

Example 2

(heterogeneous granulation)—granules were produced using the same process as that used in Example 1 but starting from the following batch of powdered materials:

| Raw materials | % by weight |
|---|---|
| Silica sand | 61.3 |
| Limestone | 18.0 |
| Sodium carbonate | 19.0 |
| Sodium sulphate | 0.4 |
| Aluminium oxide | 1.3 |

The initial water content of the starting batch is lower than 1% by weight.

The first portion of raw materials corresponding to 34% by weight of the starting batch has the following composition:

| Raw materials | % by weight |
|---|---|
| Silica sand | 15.9 |
| Limestone | 18.0 |
| Sodium carbonate | 0 |
| Sodium sulphate | 0 |
| Aluminium oxide | 0 |

The quantity of aqueous solution of 2.5% by weight sodium silicate added was 12% by weight in relation to the mixture of solution and first portion of raw materials.

The remaining second portion corresponding to 66% by weight of the starting composition and with a different composition from the first portion:

| Raw materials | % by weight |
|---|---|
| Silica sand | 45.4 |
| Limestone | 0 |
| Sodium carbonate | 19.0 |
| Sodium sulphate | 0.4 |
| Aluminium oxide | 1.3 |

Heterogeneous granules with an average water content of about 4% by weight and varying in size from approximately 0.1 mm to approximately 4 mm were thus obtained. These granules are formed from a core composed of sand and limestone enclosed by a casing composed mainly of sand and sodium carbonate.

The quantity of fine particles present in the granulator at the end of the granulation process is also very low. In fact, the starting batch of powdered materials had a high percentage of fine particles (average diameter<100 µm) in the order of 50% by weight. After the granulation according to the invention this percentage is about 8% by weight of the final granules of Example 2.

Examples 1 to 2 clearly show that the invention provides an efficient process of wet granulation that reduces and indeed eliminates the need for a drying step. Granules with water contents that are ideal for easy handling and mechanical stability thereof as well as a relatively low residual ratio of fine non-granulated particles were obtained using only a granulator without drier. It was also possible to obtain heterogeneous granules that allow selective batching by using a single granulation operation.

It is understood that the invention is not limited to the above exemplary embodiments and variant embodiments can also be applied without departing from the framework of the invention as defined by the claims.

The invention claimed is:

1. A process of producing granules from a powdered material, the process comprising:
   (A) separating the powdered material into at least a first portion and a second portion;
   (B) mixing a binder liquid to the first portion, to obtain a first mixture;
   (C) agglomerating the first mixture in a granulator, to obtain granules (a);
   (D) mixing the second portion to the granules (a) in the granulator, to obtain a second mixture; and
   (E) agglomerating the second mixture in the granulator, to obtain granules (b),
   wherein the first portion is 75% by weight at most of the powdered material.

2. The process of claim 1, wherein the powdered material comprises a raw material.

3. The process of claim 1, wherein the first portion is at least 25% by weight of the powdered material.

4. The process of claim 1, wherein the binder liquid comprises water.

5. A process of producing granules from a powdered material, the process comprising:
   (A) separating the powdered material into at least a first portion and a second portion;
   (B) mixing a binder liquid to the first portion, to obtain a first mixture;
   (C) agglomerating the first mixture in a granulator, to obtain granules (a);
   (D) mixing the second portion to the granules (a) in the granulator, to obtain a second mixture; and
   (E) agglomerating the second mixture in the granulator, to obtain granules (b),
   wherein the binder liquid comprises water and an additive.

6. The process of claim 1, wherein the quantity of binder liquid in (B) ranges from between 8% and 20% by weight of the first mixture.

7. The process of claim 6, wherein the quantity of binder liquid in (B) ranges between 8% and 16% by weight of the first mixture.

8. The process of claim 1, wherein the granules (b) comprise a water content in a range of between 2% and 6% by weight.

9. The process of claim 1, wherein the granules (b) comprise a water content in a range of between 3% and 5% by weight.

10. The process of claim 1, wherein the first portion has a composition identical to that of the second portion.

11. The process of claim 1, wherein the first portion has a different composition than the second portion.

12. The process of claim 1, wherein the powdered material comprises silica sand.

13. The process of claim 1, wherein the powdered material comprises limestone.

14. The process of claim 1, wherein the powdered material comprises dolomite.

15. The process of claim 1, wherein the powdered material comprises aluminum oxide.

16. The process of claim 1, wherein the powdered material comprises feldspar.

17. The process of claim 1, wherein the powdered material comprises sodium carbonate.

18. The process of claim 1, wherein the powdered material comprises sodium sulphate.

* * * * *